Feb. 5, 1929.
E. E. LANE
1,701,483
FEEDING MECHANISM
Original Filed Feb. 24, 1921    9 Sheets-Sheet 8
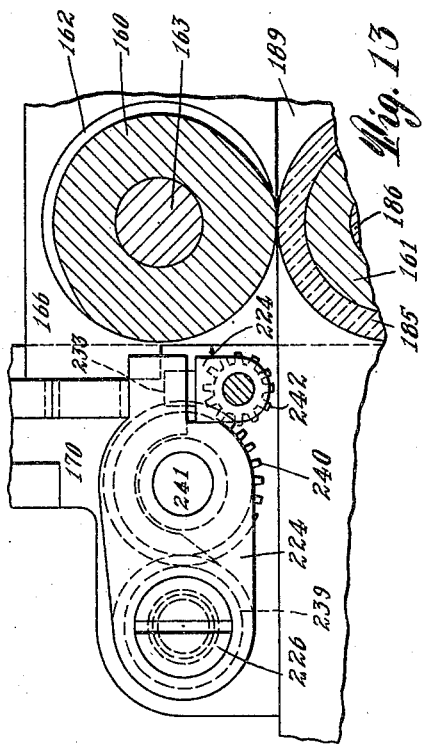
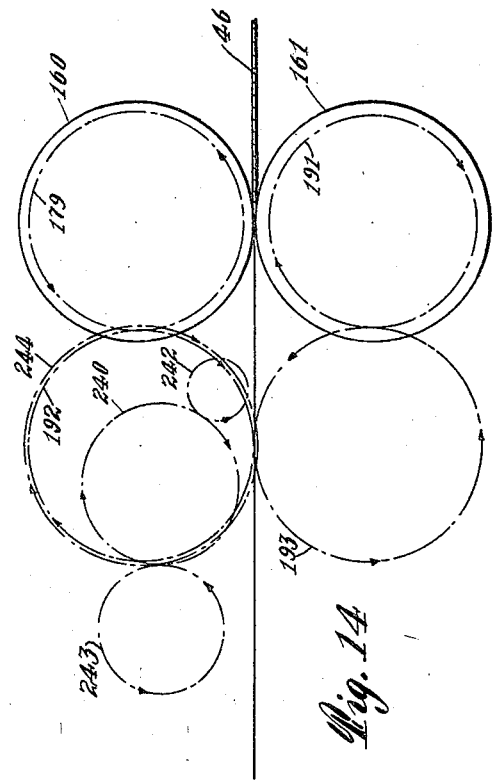
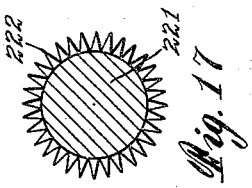
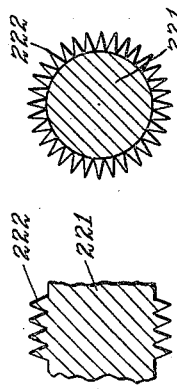
Inventor:
Elmer E. Lane

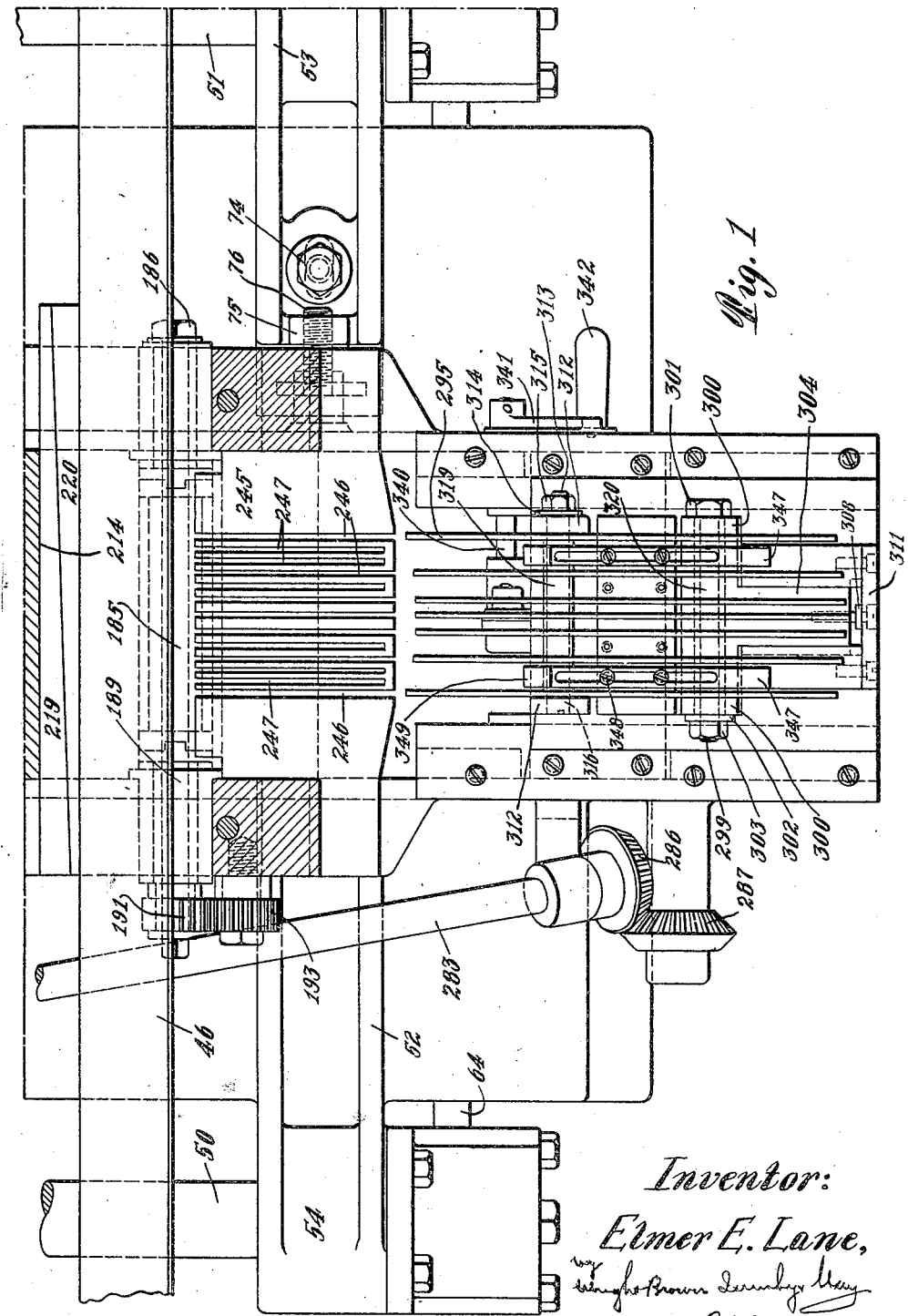

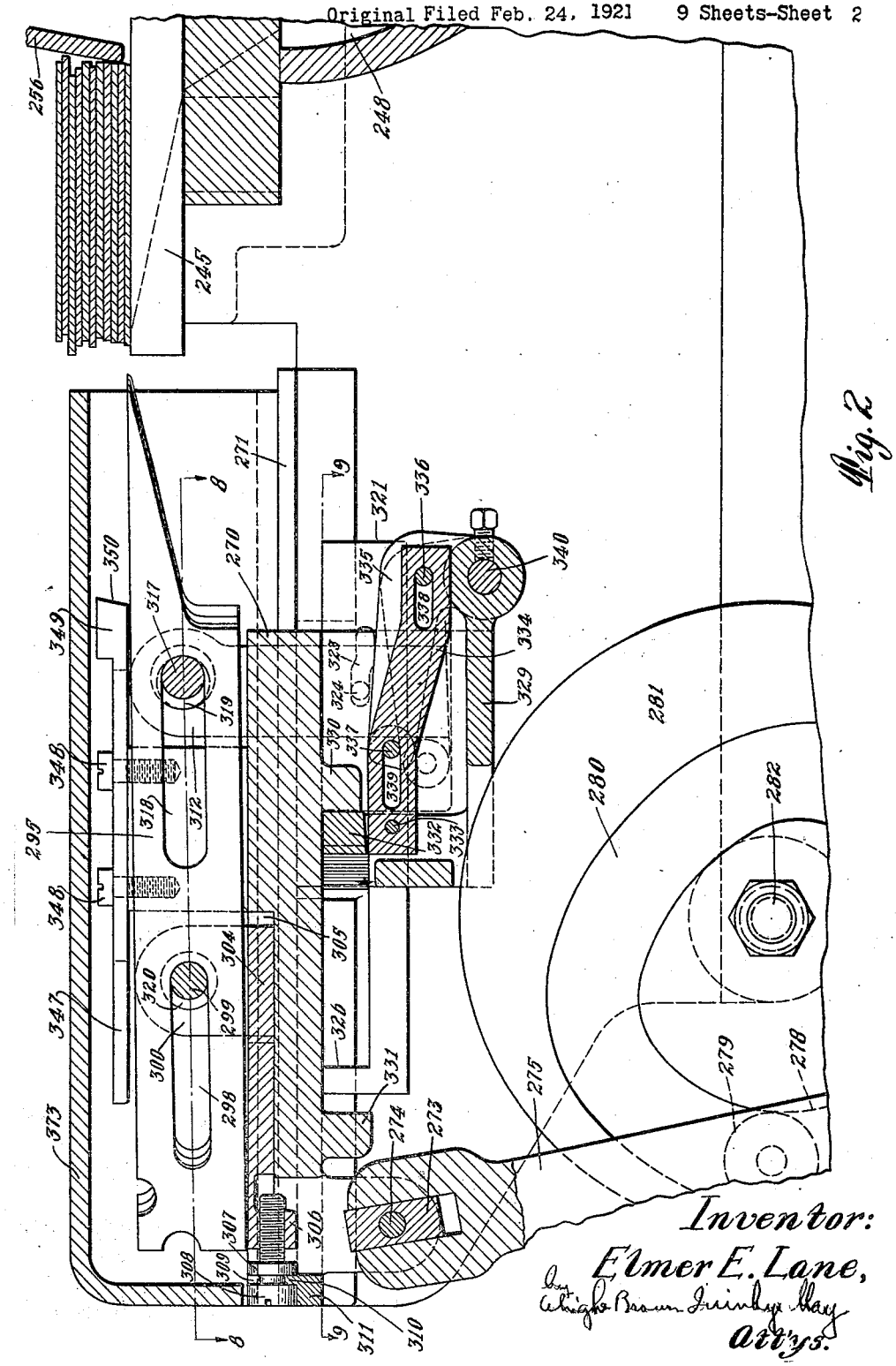

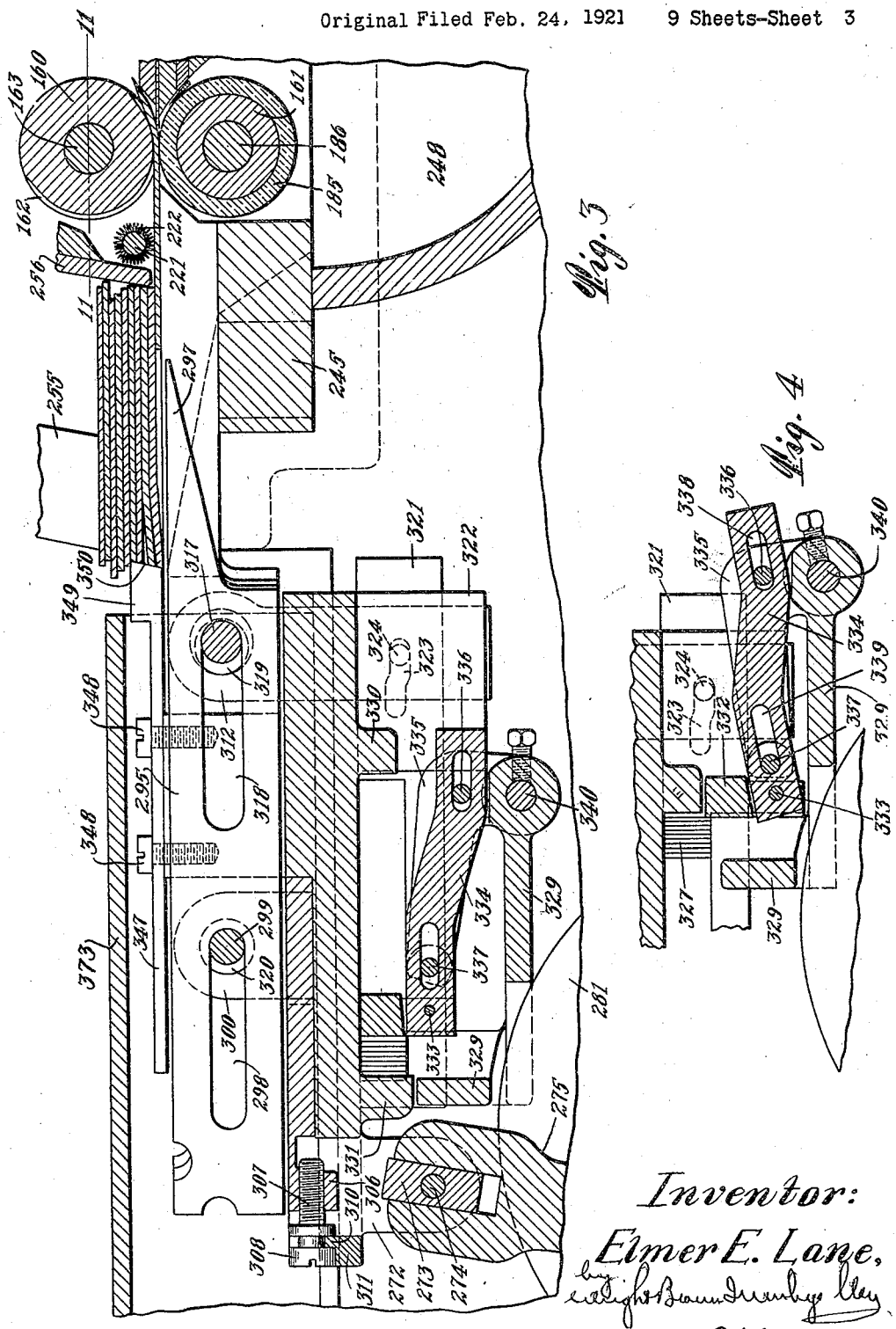

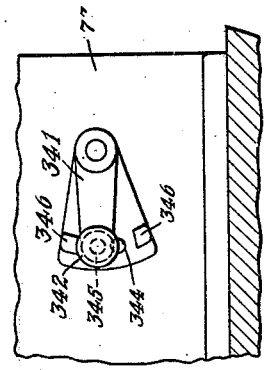
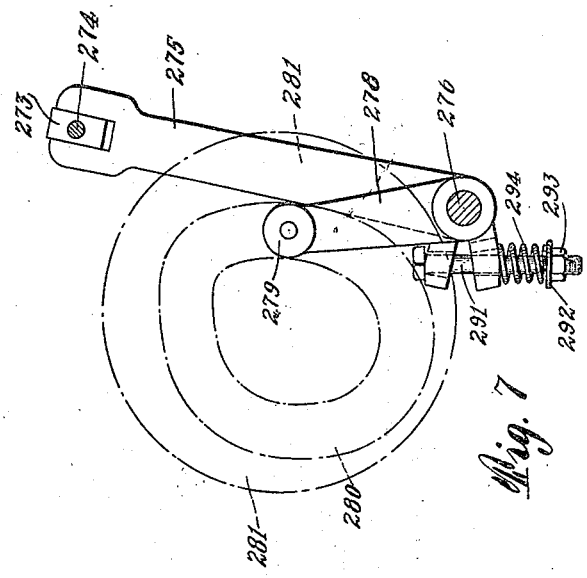
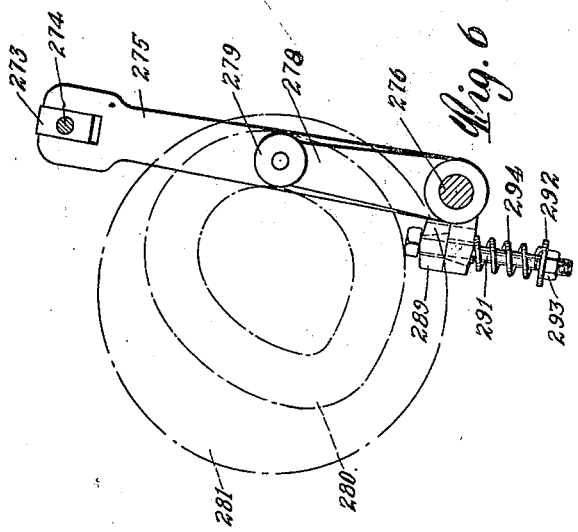

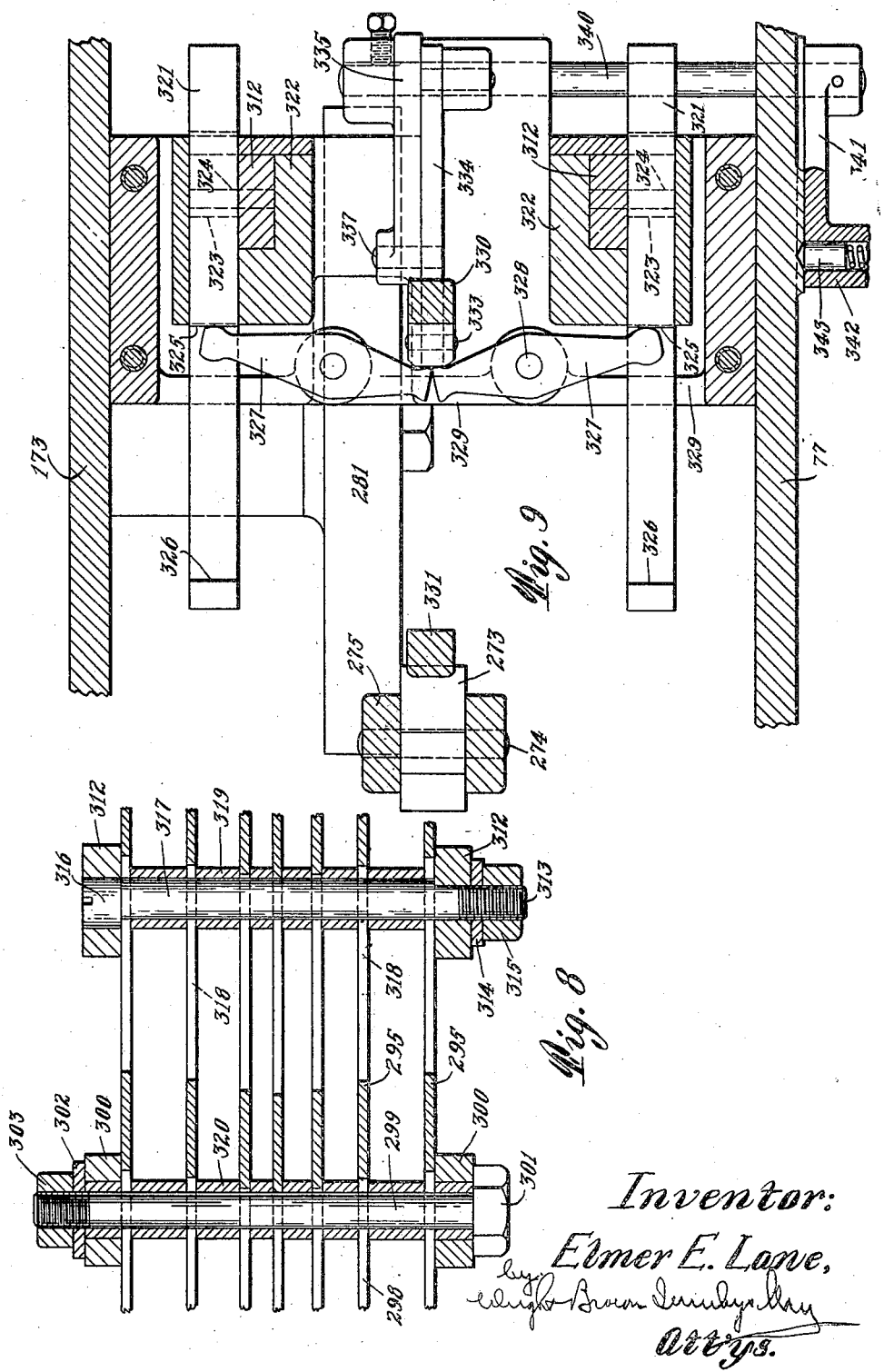

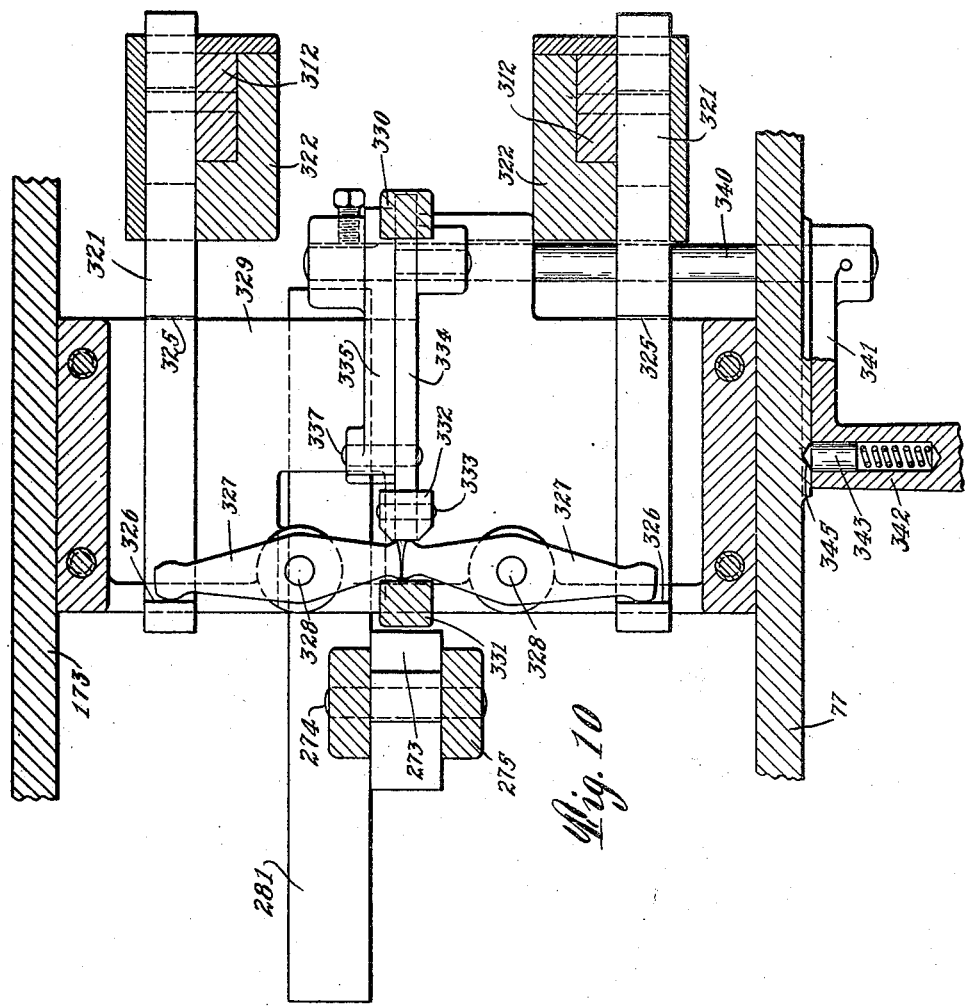

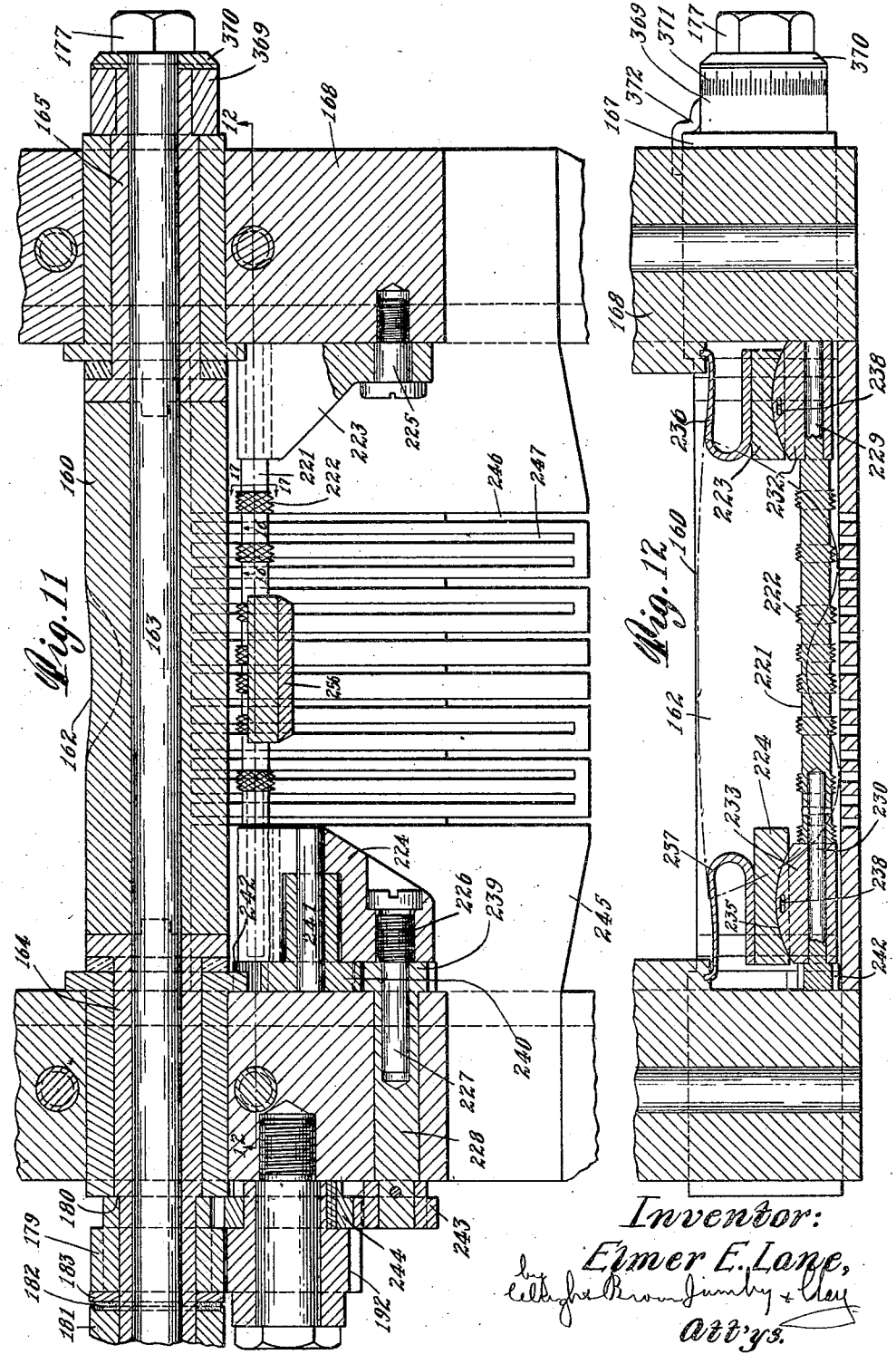

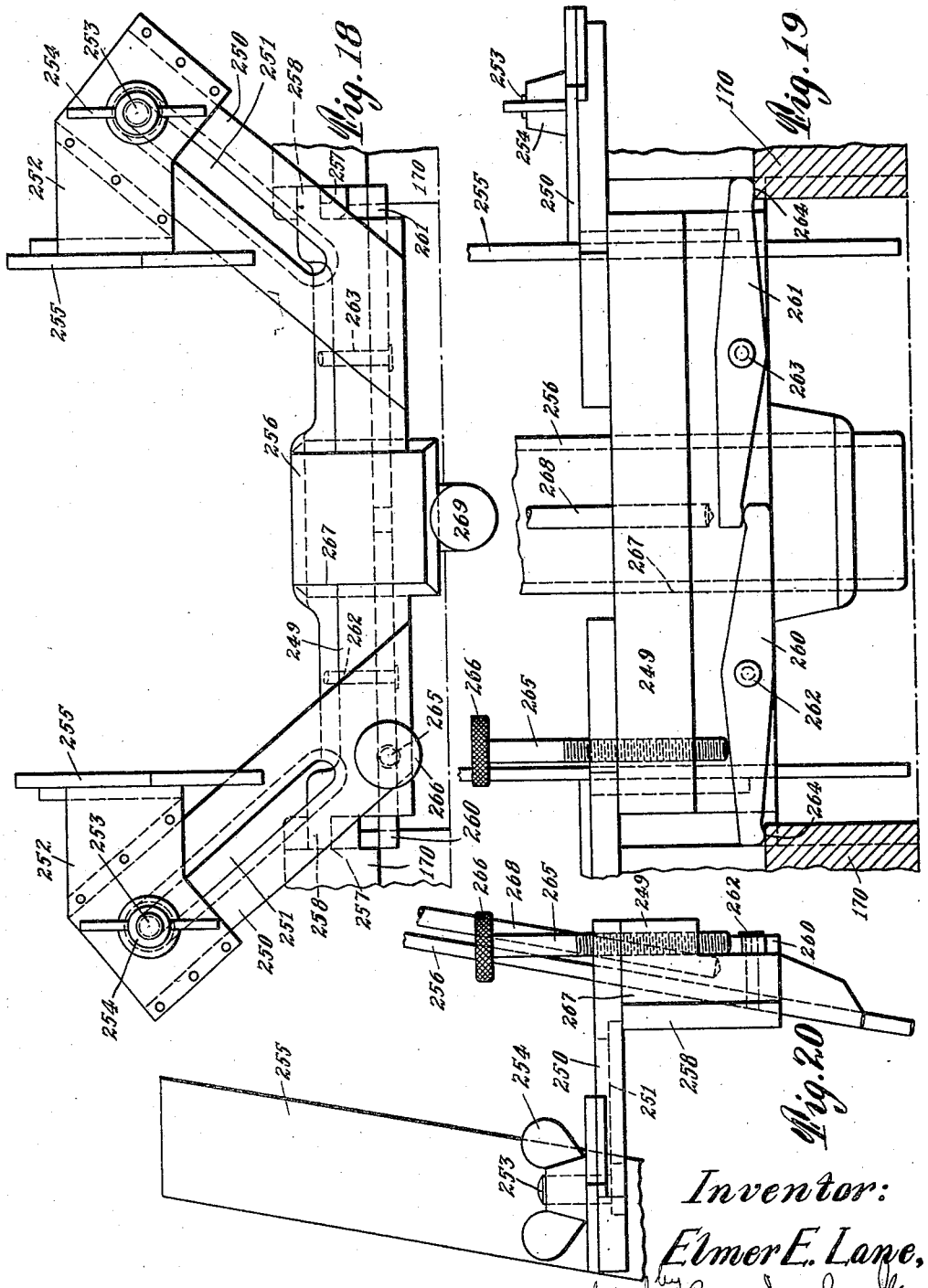

Patented Feb. 5, 1929.

1,701,483

UNITED STATES PATENT OFFICE.

ELMER E. LANE, OF DANVERS, MASSACHUSETTS, ASSIGNOR TO HARRY H. BECKWITH, OF BROOKLINE, MASSACHUSETTS.

FEEDING MECHANISM.

Original application filed February 24, 1921, Serial No. 447,384. Divided and this application filed July 20, 1925. Serial No. 44,664.

This invention relates to feeding mechanisms for feeding blanks successively from a stack and has been more particularly designed for feeding shoe stiffener blanks to skiving mechanism in the machine disclosed and claimed in my application for patent, Serial No. 447,384, filed February 24, 1921, for skiving machines of which this application is a division.
This mechanism in general comprises reciprocatory feed fingers which are normally projected through slots in a stack supporting plate or table to engage and feed the lowest blank from the stack to feed rollers, and to then return depressed below the slotted plate so as to be out of contact with the blanks. Means is also provided for manually controlling the motion of the feed fingers so that on their feeding stroke they may not rise sufficiently to contact with the blank when it is desired to interrupt the feed. This may be done without in any way affecting other operative portions of the machine.

For a more complete understanding of this invention, including further novel features, reference may be had to the accompanying drawings in which Figure 1 is a fragmentary top plan of the skiving machine showing the feeding mechanism.

Figures 2 and 3 are fragmentary vertical sections through the mechanism illustrating it in different positions of its normal movement.
Figure 4 is a detail section illustrating in inoperative position a portion of the mechanism shown in Figures 2 and 3.

Figure 5 shows a handle for this mechanism.
Figures 6 and 7 show a yielding connection in the mechanism for operating the feed fingers.

Figure 8 is a section on line 8—8 of Figure 2 through the feed bars.
Figure 9 is a section on line 9—9 of Figure 2 and shows a portion of the mechanism by which a four way motion is imparted to the feed bars.

Figure 10 represents a similar section with the parts in different positions.

Figure 11 represents a horizontal section on line 11—11 of Figure 3.

Figure 12 is a vertical section through a feed roll on line 12—12 of Figure 11.

Figure 13 is a transverse vertical section through the main rolls and illustrates a portion of the gearing for driving the supplemental roll.

Figure 14 is a diagrammatic view of certain of the gearing.

Figure 15 is a detail section through a spring for holding one end of the supplemental feed roll against the work.

Figures 16 and 17 are detail sections through the feed roll on line 16—16 and 17—17, respectively, of Figure 11.

Figure 18 is a plan view of a magazine for the blanks.

Figure 19 is a rear elevation of a portion thereof.

Figure 20 is a side elevation of the magazine.

As best shown in Figures 1 and 4, a pair of rolls 160 and 161 are employed to feed the blanks against the edge of a band skiving knife 46, one of these rolls, as 160, being recessed and the roll 161 being arranged to press each blank presented thereto into the recess or cavity 162 of the roll 160 so that the portions of the blank projecting therefrom are trimmed off by the knife. Mechanism for automatically feeding the blanks to these rolls is provided. This mechanism comprises a main feeding apparatus and also a supplemental feed roll which is located close to the rolls 160, 161. Inasmuch as the last-mentioned feed roll is driven from the roll 160, I will describe it first. The supplemental roll is indicated at 221, and it is provided with knurled or toothed portions 222 as shown in Figure 10. The roll is supported in swinging arms 223, 224, so that it can move up and down in reference to the blanks which are passing therebeneath. The arm 223 is mounted upon a screw stud 225 passed into one of the side uprights of the frame 168. The other arm 224 is adapted to swing about the axis of a stud 226 which is screwed thereinto, and which has a non-threaded end 227 inserted in a socket in a shaft 228 which forms a part of the power-transmitting mechanism for rotating the supplemental feed roll 221, as I will presently explain. The supplemental feed roll has the reduced end portions 229, 230, the latter being removable and being secured ordinarily by a pin 231 to the roll into a recess in the end of which it projects. These ends of the roll are journaled in boxes 232, 233, respectively, which are more or less spherical, and which are engaged with sockets 234, 235, in the under sides of the arms 223, 224. Springs 236, 237 are interposed between the ends of the arms 223, 224, and the stationary upright portions of the frame 168, as shown in Figure 11, so as to press the supplemental feed roll downwardly. The bearings 232, 233, and the arms 223, 224 are connected by a pin and slot connection indicated as a whole at 238. Any suitable stops may be employed for preventing the arms 223, 224 from swinging downwardly too far. For driving the supplemental feed shaft, any suitable power-transmitting mechanism may be interposed betwen the gear 179, which drives the upper recessed roll, and the end of the supplemental feed roll. As previously stated, the pivot screw pin 226 extends into the shaft 218 which is in axial alinement with the pivot pin 225. This shaft 228 is formed with a gear 239 intermeshing with an idler gear 240 journaled on a shaft 241 mounted in the arm 224, the said gear 240 having a hub extending into a recess in the arm, as best shown in Figure 8. The idler gear 240 intermeshes with a gear 242 formed on the removable end 230 of the supplemental feed roll. The shaft 228 has a gear 243 pinned thereon and intermeshing with a gear 244 which is splined on the hub of the gear 192. By the train of gearing described, the supplemental feed roll is positively driven and yet either end may yield relatively to the other when the blank to be skived is passing thereunder, or the feed roll itself may be bodily lifted by the blank against the pressure of the springs 236, 237.

When it is desired to have access to the main rolls to remove them and replace others, the supplemental feed roll may be easily detached from the machine by removing the studs 225, 226, which permits the arms 223, 224 and the parts carried thereby to be lifted forwardly. The removable frame has also a table 245 which is separately detachable or removable. This consists, as shown in Figure 1, of a metallic block which fits in the sockets 172 in the side members of the top frame 173, and it extends from the lower yielding roll forwardly to provide a flat surface on which the blanks may be fed and which will sustain the pressure of the blanks when engaged by the supplemental feed roll. This block, as shown in Figure 1, is provided with a series of slots 246 to receive feed fingers subsequently to be described. Between the slots 246, which are open from end to end, there are additional slots 247 through which air may pass down through the slots to an air duct 248 (see Figures 2 and 3), which serves as a conduit for removing the skivings. The slots 247 have inclined lower walls so that there is a direct communication for the atmosphere through the slots to the conduit 248. The inner end of the block 245 is beveled, as shown in Figure 4, so as to extend in as closely as possible to the nip of the rolls 160, 161, and the upper surface of the table formed by the block is in a plane tangenial to the two rolls and coincident with the plane of the upper stretch of the knife. This block may be removed to permit access to the roll 161 when it is desired to remove the latter.

The blanks, which are cut into proper shape (for example, in the shape so as to be used as a toe box), are stacked in a magazine which is shown in detail in Figures 18 to 20, inclusive. It comprises a cross block or plate 249 which is arranged at a slight angle from the vertical and which lies in front of the upper roll 160. To the top of this plate are formed or secured the two forwardly-diverging bars 250, 250, which are longitudinally slotted at 251. On these plates are secured adjustable slides 252, 252, into which screws, passing through the slots 251, are passed, the heads of the screws being below the plates 250. Wing nuts 254 are located on the upper ends of the screws so that, after the slides have been adjusted to proper position, they may be clamped in place. Each of the slides 252 is angular in plan view, as shown in Figure 18, and to the inner end of each is secured an upright plate 255. The inner faces of these plates are parallel, and in side elevation they are rearwardly inclined so as to form side guide walls for the stack of blanks which is placed in the magazine. To the main plate 249 there is secured an upright bar or plate 256 which forms the rear wall of a chute, the side walls of which are formed by the plates 255. A stack of blanks may be placed in the magazine thus formed, with the lowermost blank resting on the table afforded by the block 245. It is desirable that the entire magazine may be adjusted up and down so as to vary the distance between the lower end of the upright back wall of the chute or magazine from the table. For this purpose, the side walls 170 of the removable frame are formed with grooves 257 into which tongues 258 project from the main back wall or plate 249 of the magazine, so that the magazine as a whole may slide up and down in the grooves or guideways. For the purpose of effecting the vertical adjustment of the entire magazine, any suitable means may be provided. In Figures 18 and 19, however, I have illustrated a mechanism which is applicable for the purpose and which comprises the two two-armed levers 260, 261. These levers are respectively pivoted at 262, 263 to the main back plate 249, and the inner end of the lever 261 rests against the inner end of the lever 260. The outer ends of these levers rest on shoulders 264 formed on the side walls 170. An adjusting screw 265 is threaded through an aperture in the plate 249 and bears against the outer arm of the lever 260. Consequently, by rotating the knurled head 266 of this groove, the two levers 260, 261 may be swung about their respective pivots so as to raise or lower the magazine as may be desired. The upright rear wall or plate 256 is capable of vertical or endwise adjustment relatively to the back plate 249. Its side edges are beveled so that it may slide in a complementally-formed guideway 267 in the back plate 249. The back plate is provided with an upright post 268 located in a socket formed therein, and against the end of this post there is located a screw 269 which is passed through a flange 270 formed in the upright rear wall member 256. A coiled tension spring 271 has one end attached to the flange 270 and its other end secured to a collar 272 on the post 268. This spring draws the rear wall 256 of the magazine downwardly until the end of the abutment screw 269 engages the post 268. Consequently, by rotating the screw 269 in one direction or the other, the rear wall 256 may be raised and lowered, and its lower end adjusted towards and from the table.

The magazine, as thus described, is capable of holding a pile of blanks to be skived with the front edges of the blanks resting against the rear wall 256 of the magazine. The side walls 255 engage the ends of the blanks and hold them against endwise dislocation. Inasmuch as the side walls 255 are adjustable longitudinally of the converging plates 250, 250, they may be caused to approach and recede from each other and also to be moved toward the rear wall 256 without affecting the parallel relationship of the said side walls 255. The whole magazine may be easily lifted from the machine to permit access to the supplemental feed roll and the main rolls. The lower end of the magazine is so adjusted in reference to the table that the lowest blank in the pile may be moved rearwardly to be gripped by the supplemental feed roll, the remainder of the pile being maintained in place.

The main feeding mechanism, by which the blanks are removed successively from the bottom of the pile, comprises a plurality of fingers or feed dogs to which is imparted a four-way motion, so that they can be advanced with their operative ends in the horizontal planes of the lowermost blank, and then dropped so as to be withdrawn below the plane of the table, and consequently out of frictional engagement with the then lowest blank in the magazine. This feed mechanism is supported beside the magazine by the walls 77, 173 of the frame, which are secured upon the flat top of the upper section 40 of the main frame. The feed mechanism comprises a sliding carriage 270 which is movable back and forth on guides 271 secured to the top webs of the walls 77, 173, as best shown in Figure 2. The rear end of the carriage is provided with depending lugs 272 in which a block 273 is pivoted by a pintle 274. This block is engaged in a slotted end of a cam-operated lever 275 by which the carriage may be reciprocated longitudinally of the guideways 271. The hub of the lever 275 is secured to a rock shaft 276 which is journaled in a bearing bracket 277 formed on or secured to the front face of the top section 40 of the frame. There is loosely mounted on this same shaft 276 another lever 278 having on its end a roll or truck 279 located in a path or groove 280 in a cam disk 281 secured to a shaft 282. This shaft is journaled in a bearing at the front of the machine and is driven by any suitable means from one of the driven shafts in the machine. For this purpose I have shown an inclined shaft 283 provided with a bevel gear 286 intermeshing with and driving a complemental bevel gear 287 on the shaft 282. It is desirable that a yielding connection be interposed between the two levers 275 and 278, so that, if the feeding fingers to be described encounter abnormal resistance, the lever 275 may yield in its feeding movement. For this purpose, the lever 275 is provided with an angular lug 289 adapted to overlap a similar lug 290 on the lever 278, as best shown in Figures 6 and 7. A bolt 291, having its head resting on the lug 289 and its shank passed loosely through an enlarged aperture therein, extends downwardly through a slot in the lug 290 and is provided at its lower end with a washer 292 and a lock nut 293. A spring 294 is interposed between the washer and the lug 290. By virtue of this arrangement, the lever 275 is rocked in its feeding direction yieldingly as will be readily understood. The mechanism as thus far described provides for the reciprocation of the carriage 270 in timed relation to the rotation of the main rolls 160, 161.

Upon the carriage 270 are located a plurality of feed fingers which are adjustable longitudinally independently of each other so that their ends may be caused simultaneously to engage a curved or irregular edge of the blank to be fed. These feeding fingers are indicated at 295, and, as shown in Figure 1, there are seven of them arranged to enter the slots 246 in the table. One of the fingers is adapted to engage the edge of the blank midway between its ends, and the others are so disposed as to engage the edge of the blank approximately near its ends and at points intermediate of the ends. Each feeding finger consists of a relatively narrow strip of metal having a tapered forwardly-projecting end 297, the extremity, however, being blunt so as to engage the edge of the blank. The rear portion of each feeding finger has a longitudinal slot 298, and through these slots there extends a bolt 299 which is located in upstanding lugs 300 on the carriage. The bolt is provided with a head 301 at one end, and with a washer 302 and a nut 303 at the other end, so that after the individual fingers have been adjusted longitudinally, they may be clamped in their adjusted position by tightening the nut 303. The upstanding lugs 300 are not integral with the carriage 270 but are adjustable longitudinally thereof so that the entire group of feeding fingers may be adjusted as a unit. For this purpose, the lugs 300, 300, are formed on a plate 304 which is set in a guideway 305 in the upper portion of the carriage 270. This plate has a depending lug 306 with which a screw 307 is in threaded engagement. The head 308 of the screw has a groove 309 engaging a rib 310 on a short bar 311 secured to the end of the carriage (see Figures 1 and 2). By rotating the screw 307, the plate 304 and the feed fingers may be adjusted longitudinally of the slide so as to vary the limits of their feeding and recessional movements. I employ a novel mechanism for swinging the operative ends of the feed fingers 295 vertically so as to locate them above or below the plane of the table on which the pile of blanks rests, as indicated in Figure 2. This mechanism comprises two upright slides 312 which are vertically movable relatively to the carriage 270 and which are located in grooves formed therein. Passing transversely through the upper ends of these slides 312, there is a bolt 313 having a washer 314 and nut 315 on one end and a head 316 on the other end. Between its ends, this bolt has an eccentric portion 317 which passes through slots 318 formed longitudinally in the forward portions of the feed fingers 295, so that, by rotating the bolt upon its axis, the forward ends of the feed fingers may be bodily adjusted as a unit up and down, after which the bolt may be secured in its adjusted position by tightening the nut 315. On this bolt are strung tubular spacers 319 located between the feed fingers to hold them in proper relation. Similar spacers 320 may be strung on the bolt 299, if desired (see Figure 8). It will thus be seen that the individual fingers are capable, not only of individual longitudinal adjustment, but of such adjustment simultaneously or as a unit, and that they may be adjusted about the axis of the bolt 299 to raise or lower their operative ends all as a unit. I provide means under manual control by which the upright sliding members 312 may be raised when the carriage reaches the end of its recessional movement, and lowered when the carriage reaches the end of its feeding movement. These means comprise cam or wedge members 321 which are arranged to slide horizontally in guideways formed in depending portions 322 of the carriage, as best shown in Figures 2 and 9. The members 321 are provided with longitudinal cam grooves 323, through which pins 324 are passed into upright slides 312. These slots are formed, as shown in Figures 2 and 3, so that the forward portions thereof are in a horizontal plane lower than the rear portions, so that, by effecting a relative sliding movement of the members 321 longitudinally of the slots 323, the members 312 may be raised or lowered as the case may be. In plan view, each of these two cam members 321 is provided with two shoulders 325, 326, which are spaced apart as shown in Figures 25 and 26, and into the recesses between the shoulders, there extend the outer ends of two two-armed levers 327 which are respectively pivoted on upright pins 328 extending upwardly from a cross bar 329 formed on or secured to the upright side frames 77, 173. This cross bar is in the shape of a yoke, and the pins extend upwardly from the lower portion thereof. Consequently the pivot pins 328 are stationary relatively to the travel of the main carriage 270. The inner arms of the two levers 327 are curved about the axes of the pivots 328 and are closely adjacent so that they may be engaged by abutment members movable with the carriage for rocking said levers. If these levers were stationary or immovable and the carriage were moved back and forth relatively to them so that the ends of the levers would be engaged by the shoulders 325, 326, on the cam slide members 321, it would follow, of course, that, as the carriage reached the end of its recessional movement, the slides 321 would be held against movement so that the upright slides 312 would be lowered; and that, when the carriage reached the end of its feeding movement, the upright slides 312 would be raised; and this would cause just the opposite actuation of the feed fingers in respect of their up and down movement that is desired. Of course, it would be possible to change the shape of the slots 323, so that, if the abutment levers 327 were stationary, the feed fingers could be raised at the end of their recessional movement and lowered at the end of their feeding movement, but I prefer to provide the feeding mechanism with devices under manual control by which the feed fingers may travel back and forth with the carriage and remain below the level of the table so as to stop the feed of the blanks; and it is for this reason, among others, that I employ the levers 327 and the mechanism by which they are swung about their centers or pivots 328. It will be observed that the carriage is provided with two depending lugs 330, 331 (see Figure 2), which are spaced apart longitudinally of the travel of the carriage and which are in line with the inner ends of the levers 327, as shown in Figure 9, so that, as the main feeding carriage is reciprocated, these two lugs or abutments are moved back and forth relatively to the inner ends of the levers 327. The parts are so spaced that, when the carriage is reaching the end of its feeding movement so that the shoulders 326 of the cam slide 321 are in engagement with the outer ends of the levers 327, the lug or abutment 331 will engage the inner ends of the levers and swing them forwardly about their pivots 328, so that the outer ends of the levers will move the cam slides 321 rearwardly and thus depress the operative or forward ends of the feed fingers. The abutment 330, however, is spaced such a distance from the abutment 331 that, when the carriage slides rearwardly and stops, the abutment 330 will just engage the inner ends of the levers and not swing them about their pivots, so that thereafter the main carriage may be fed back and forth without effecting any vertical movement of the opposite ends of the feed fingers. A movable abutment 332, however, is provided which may be interposed between the abutment 330 and the inner ends of the levers 327, so that, when the main carriage slides rearwardly, the inner ends of the levers will be engaged by the supplemental abutment 332 and swung about their pivots so as to force the cam slides 321 forwardly and thus raise the forward ends of the feed fingers. This movable abutment 332 is under manual control and it is pivoted by a cross pin 333 to a bar 334. The said bar is supported by a right-angle lever 335 which has pins or studs 336, 337, extending through longitudinal slots 338, 339, in the bar 334. The lever 335 has its hub rigidly secured to a rock shaft 340, which is journaled in the yoke-shaped cross bar 329 and projects through the upright frame member 77. Hence, by rocking the shaft 340, the bar 334 may be moved from the position shown in Figure 20 to the position shown in Figure 19, so as to carry the supplemental abutment 332 from planes below the planes of travel of the abutment lug 330, into the path of movement thereof. In order to hold the bar 334 in this position, the shaft 340 is provided on its end, which extends through the frame member 77, with a crank arm 341 provided with a handle 342. In the handle there is a spring-pressed pin 343 whose pointed end may be caused to engage either of two recesses 344, 345, formed in the outer face of the frame member 77. Adjacent said recesses are stop members 346 to limit the movement of the crank lever 341, as best shown in Figure 5. It is necessary that the bar 334 should have a limited sliding movement relatively to the angle lever 335 on which it is mounted, as, of course, the supplemental abutment 332 must have a limited sliding movement with the main carriage due to the engagement of the abutment 330 with the supplemental abutment 332.

The operation of the mechanism will be understood in connection with the illustration thereof presented by Figures 2, 3, 4, 9 and 10. In Figure 4, the manually-controlled supplemental abutment 332 is in an inactive position so that the main carriage may slide back and forth with the operative ends of the feed fingers located below the plane of the table on which the pile of blanks rests. If it is desired to impart an up and down movement to the feeding ends of the feed fingers, the operator, at a time when the main carriage has moved forwardly from its rearmost position, swings the rock shaft 340 about its axis so as to raise the bar 334 from the position shown in Figure 4 to the position shown in Figure 3, and thus brings the supplemental abutment member 332 into the path of movement of the abutment lug 330. Then, when the main slide moves rearwardly from the position shown in Figure 3 to the position shown in Figure 2, as it reaches the end of its recessional movement, the abutment 330 engages the supplemental abutment 332 and moves it rearwardly, thereby swinging the levers 327 about their axes so that their outer ends will be moved forwardly while in engagement with the shoulders 325 of the cam slides 321 so as to move said slides forwardly in a direction opposite to the recessional travel of the main carriage, and, through the pin and slot connections 323, 324, raise the vertical slides 312, and thus project the feeding ends of the feed fingers upwardly into the planes of the lowermost blank in the magazine. The extent of this up and down movement of the feed fingers is shown by comparing Figures 2 and 3. In Figure 3, the feed fingers have reached the ends of their forward or feeding movement and have been depressed so that they may be carried rearwardly out of engagement with the then lowest blank in the magazine. In Figure 2, the carriage has reached the end of its recessional movement and the feed fingers have been raised so that they may then engage the bottom blank in the pile and feed it forwardly far enough to be engaged by the supplemental feed roll and the main roll. In Figure 2, the blank $b$, which is resting upon the table and which is at the bottom of the pile, is shown in Figure 3 as having been fed forwardly so that it is in the grip of the rolls 160, 161. At any time when the operator observes that the blanks are not being fed properly, he may depress the crank lever 331 so as to render the feed fingers inactive, whereafter the feed carriage will move back and forth without effecting the feed of the blanks.

Blanks, which are designed for use either for stiffening the counter or the toe of a shoe, are provided with curved edges so that it is quite difficult to present them accurately to the main rolls which in turn present them to the skiving knife, and it is practically impossible to feed them through the magazine so that they will register accurately with the ends of the feed fingers for the feeding mechanism which may be employed. I therefore provide a supplemental positioning mechanism by which the lower blanks of the pile are properly positioned before they are engaged by the ends of the feed fingers. This positioning mechanism comprises two elongated slotted bars 347, 347, which rest upon the main carriage between the two outer pairs of feed fingers 295, as shown in Figure 1. These bars are longitudinally slotted as stated, and through the slots screws 348 are passed into the carriage, so that, by loosening the screws, the positioning bars may be adjusted endwise. At its front end, each of the bars 347 is provided with a head 349 with its front end beveled at 350. These heads are located just above the feed fingers when the latter are in their highest positions, and they are arranged so that, when the feed carriage is moved forward almost to the extent of its feeding movement, these positioning bars will engage three or four of the lowest blanks in the pile in the magazine, and, by reason of the fact that they engage the blanks at relatively remotely separated points near the ends of the blanks, they swing the blanks sufficiently so that they will be properly engaged by the feed fingers when they successively reach the bottom of the pile; and thus, as the feed fingers engage each positioned blank, they present it accurately to the rolls 160, 161, so that it will register in the cavity in the roll 160.

Having thus described an embodiment of this invention it should be evident to those skilled in the art that various changes and modifications may be made therein without departing from its spirit or scope as defined by the appended claims.

I claim:

1. In a machine of the class described, a reciprocatory feed carriage, a plurality of feed fingers thereon, and means for mounting said fingers on said carriage whereby they may be adjusted longitudinally independently of each other and also as a unit.

2. In a machine of the class described, a reciprocatory feed carriage, a plurality of feed fingers thereon, arranged in parallelism and longitudinally of the path of movement of the carriage, means by which each of said fingers may be adjusted lengthwise independently of the others, and means by which the fingers may be adjusted in a group lengthwise.

3. In a machine of the class described, a reciprocatory feed carriage, a plurality of feed fingers thereon, a guideway for the carriage, means for reciprocating said carriage in said guideway, and means on the carriage for moving said fingers up and down.

4. In a machine of the class described, a reciprocatory feed carriage, a plurality of feed fingers thereon, a cross pivot pin on said carriage engaged in slots in said fingers, and means for adjusting said fingers as a group about said pivot pin.

5. In a machine of the class described, a reciprocatory feed carriage, a plurality of feed fingers thereon, parallel cross pins on said carriage engaged in slots in said fingers, and spacers on said pins located between said fingers.

6. In a machine of the class described, a reciprocatory feed carriage, a plurality of feed fingers thereon, upright slides for moving the fingers into and out of the planes of the blank, a cam member movable with said carriage and movable relatively to said slides, and stationary abutments for engaging said cam member.

7. In a machine of the class described, a reciprocatory feed carriage, a plurality of feed fingers thereon, a magazine for a pile of blanks, a work table on which said pile may rest with the lowest blank in position to be engaged by said feed fingers, and members on said carriage above said feed fingers for engaging blanks in the magazine and positioning them preparatory to their being fed by said fingers.

8. In a machine of the class described, a reciprocatory feed carriage, a plurality of feed fingers thereon, a magazine for a pile of blanks, a work table on which said pile may rest with the lowest blank in position to be engaged by said feed fingers, laterally spaced bars on said carriage adjustable lengthwise, means for securing said bars above said fingers, and beveled heads on said bars for engaging the blanks above that engaged by the feed fingers.

9. In a machine of the class described, a reciprocatory feed carriage, a plurality of feed fingers thereon, mechanism for reciprocating said carriage, mechanism for moving said fingers up and down relatively to said carriage, and manual means for throwing said last mentioned mechanism out of action.

10. In a machine of the class described, a work plate on which a pile of blanks may rest, a magazine for said pile of blanks, a feed carriage, feed fingers thereon arranged to move back and forth under the pile of blanks below the level of the feed table, and mechanism, under manual control, for automatically raising and lowering said fingers into and out of the planes of the lowest possible blank of the pile.

11. In a machine of the class described, a work plate on which a pile of blanks may rest, a magazine for said pile of blanks, a feed carriage, feed fingers thereon arranged to move back and forth under the pile of blanks below the level of the feed table, automatic mechanism for raising and lowering said fingers into and out of the plane of the lowest blank of the pile, mechanism for reciprocating said carriage, and manually operated means for throwing said automatic mechanism out of action without interrupting the reciprocation of said carriage.

12. In a machine of the class described, a work plate on which a pile of blanks may rest, a magazine for said pile of blanks, a feed carriage, feed fingers thereon arranged to move back and forth under the pile of blanks below the level of the feed table, and mechanism for moving said fingers into and out of the planes of the lowest blank in the pile, comprising vertical slides on said carriage connected to said fingers, cam or wedge members on said carriage engaged with said slides and movable lengthwise of the path of said carriage, stationary abutments, and pivoted levers on said carriage, engaged with said wedge or cam member and arranged to engage said abutments as said carriage is reciprocated.

13. In a machine of the class described, a work plate on which a pile of blanks may rest, a magazine for said pile of blanks, a feed carriage, feed fingers thereon arranged to move back and forth under the pile of blanks below the level of the feed table, and mechanism for moving said fingers into and out of the planes of the lowest blank in the pile, comprising vertical slides on said carriage connected to said fingers, cam or wedge members on said carriage engaged with said slides and movable lengthwise of the path of said carriage, stationary abutments, pivoted levers on said carriage, engaged with said wedge or cam members, and arranged to engage said abutments as said carriage is reciprocated, and a manually operated member movable into and out of position between said levers and one of said abutments.

14. In a machine of the class described, means for feeding said successive blanks from a pile thereof, a work plate for supporting said pile, a magazine for said pile comprising a main block or plate, diverging bars on said plate upright parallel side walls adjustable longitudinally on said bars to vary the effective distance between said walls, and a vertical rear wall secured to said main block or plate.

15. In a machine of the class described, a table for supporting a pile of blanks, said table having a pair of sets of slots therethrough, reciprocating feeding devices extending through one set of slots, and a vacuum duct communicating with the other set of slots.

16. In a machine of the class described, a table for supporting a pile of blanks, said table having a pair of sets of slots therethrough, four motion reciprocating feeding devices extending through one set of slots, and a vacuum duct communicating with the other set of slots.

17. In a machine of the class described, a table for supporting a pile of blanks, said table having slots therethrough, feeding devices reciprocable in said slots, means for raising said devices above the surface of said table on one direction of traverse to engage and feed the lowest blank of the pile, and a vacuum duct communicating through said table with the lower face of the lowest blank of the pile.

18. In a machine of the class described, a table for supporting a pile of blanks, said table having slots therethrough, feeding devices reciprocable in said slots, means for raising said devices above the surface of said table on one direction of traverse to engage and feed the lowest blank of the pile, a vacuum duct communicating through said table with the lower face of the lowest blank of the pile, and means for rendering said raising means inoperative.

19. In a machine of the class described, a magazine for a pile of blanks, a work table sustaining said pile of blanks and having a plurality of parallel slots, a reciprocatory carriage beside said table and having feed fingers adapted to extend into and move longitudinally of said slots, mechanism for reciprocating said carriage, mechanism for elevating said feed fingers above the surface of said table for their feeding stroke and depressing them below the surface of the table for their recessional stroke, and means by which the last mentioned mechanism may be thrown out of action without affecting the reciprocation of the carriage.

In testimony whereof I have affixed my signature.

ELMER E. LANE.